HORIZONTAL DEFLECTION SYSTEM FOR CATHODE RAY TUBES

Filed Jan. 2, 1957

INVENTOR.
ROBERT C. MOORE
BY
[signature]
ATTORNEY

United States Patent Office 2,903,621

Patented Sept. 8, 1959

2,903,621

HORIZONTAL DEFLECTION SYSTEM FOR CATHODE RAY TUBES

Robert C. Moore, Huntingdon Valley, Pa., assignor to Philco Corporation, Philadelphia, Pa., a corporation of Pennsylvania Application January 2, 1957, Serial No. 632,100

3 Claims. (Cl. 315—27)

Figure 1:
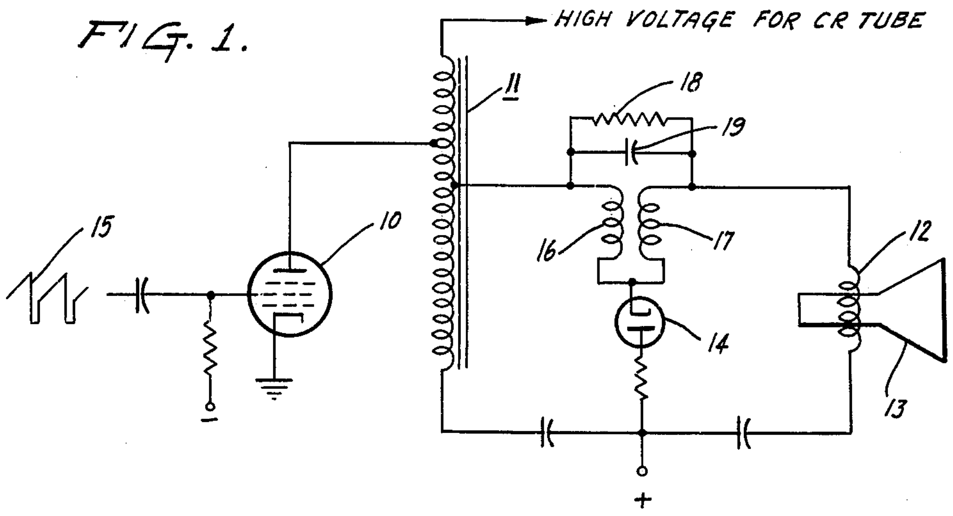

This invention relates to horizontal deflection systems for cathode ray tubes, and more particularly to the elimination or minimization of ringing currents in such systems.

The invention is particularly applicable to the horizontal deflection system of a television receiver, and therefore it will be described with particular reference to such application.

The horizontal magnetic deflection system now commonly employed in television receivers includes an output or driver tube, an output transformer, a magnetic deflection yoke whose horizontal deflection coils are connected to the transformer, and a damper tube also connected to the transformer in cooperative association with the horizontal deflection coils. Usually, the transformer is an auto-transformer, and high voltage for the second anode of the cathode ray tube is derived therefrom. A signal of suitable form is supplied to the driver tube which conducts during approximately the whole of the trace interval and is cut off during the retrace interval. Upon cutoff of the driver tube, the energy in the yoke is transferred to the transformer.

As is well known, the mode of operation and the oscillatory character of the deflection system cause undesired transient oscillations, giving rise to so-called ringing currents which tend to persist through the trace interval and tend to produce noticeable visual effects in the image. Furthermore, while it is economically advantageous to derive high voltage from the deflection system for application to the second anode of the cathode ray tube, in such a system the ringing currents are more pronounced and more troublesome.

Various proposals have been made in the past for the elimination or minimization of ringing current. These have generally been directed toward dissipation or damping of the ringing current or diversion thereof away from the deflection coils. Such proposals have not been adequate in practice to provide a wholly satisfactory solution of the problem.

In a copending application of P. G. Wolfe, Serial No. 547,407, filed November 17, 1955, now Patent No. 2,809,327, a different approach to the problem is described. It having been determined that ringing current originates in the output transformer, Wolfe discovered that the ringing voltage goes through a null point on the transformer, and that the transformer could be effectively isolated from the horizontal deflection coils, so far as the ringing voltage is concerned, by connecting the coils to a preestablished null point on the transformer.

The present invention is based upon still another approach to the problem and involves a different novel concept. According to this invention, ringing current in the horizontal deflection coils is eliminated or minimized by producing a voltage which effectively counteracts the voltage across the damper tube produced by ringing current, so that little or no ringing voltage is produced across the deflection coils and consequently little or no ringing current flows in the coils.

One object of the present invention, therefore, is to provide a novel arrangement for eliminating or minimizing ringing current in the deflection coils of a horizontal deflection system.

Another object of the invention is to provide a simple and inexpensive arrangement for this purpose.

In accordance with this invention, there is provided a horizontal deflection system comprising an output transformer to which the horizontal deflection coils are connected for supplying deflection current to the coils, a damper tube also connected to the transformer in cooperative association with the deflection coils, and means for producing in response to the ringing current a voltage effective substantially to counteract the ringing voltage drop across the damper tube, thereby substantially to prevent the existence of ringing voltage across the deflection coils. As hereinafter described, this invention provides a balancing bridge arrangement by which the desired result is achieved.

Figure 2:
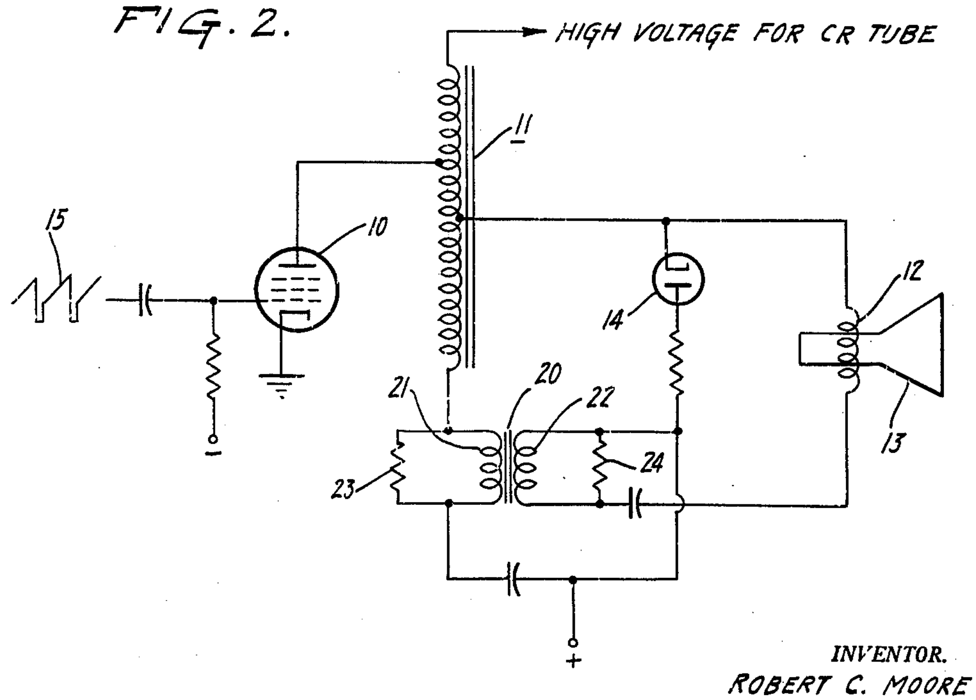

The invention may be fully understood from the following detailed description with reference to the accompanying drawing, wherein Fig. 1 is a schematic illustration of the pertinent portion of a horizontal deflection system embodying one form of the present invention; and Fig. 2 is a similar illustration showing another embodiment of the invention .

Referring first to Fig. 1, there is shown the pertinent portion of a horizontal deflection system comprising an output or driver tube 10, an output transformer 11 which is preferably an autotransformer as shown, a deflecting yoke which includes the horizontal deflection coils, represented at 12, associated with the cathode ray tube 13, and a damper tube 14 which is preferably a diode. These elements may be connected as shown, the horizontal deflection coils being connected to the transformer to receive deflection current, and the damper tube 14 also being connected to the transformer.

As thus far described, the system is conventional and its operation is well understood. A signal, such as represented at 15, is supplied to the control grid of the driver tube 10, and the latter serves as a switch to control the supply of energy to the horizontal deflection coils 12 through the transformer 11. In a system of this character, ringing current flows from the transformer through the dampener tube, and this current produces a voltage variation across the horizontal deflection coils during the scan or trace interval, which produces a ringing current in the deflection coils. This invention is directed to the elimination or minimization of ringing current in the deflection coils.

In accordance with this invention, a voltage is produced which is effective substantially to counteract the ringing voltage drop across the damper tube, thereby substantially to prevent the existence of ringing voltage across the deflection coils. In the embodiment shown in Fig. 1, a pair of closely-coupled coil sections 16 and 17 are serially connected between the output transformer 11 and the high potential end of the deflection coils 12, and the cathode of the damper tube 14 is connected to the junction point of the two coil sections. The latter are damped by a shunt resistor 18, and are caused to be resonant at the ringing frequency by means of shunt capacitor 19. In practice, the two coil sections 16 and 17 may be portions of a single coil.

In this arrangement, ringing current from the output transformer 11 flows through the coil section 16 and the voltage drop thereacross is transformed so as to appear in opposite polarity across coil section 17. The ringing voltage across the deflection coils 12 is the sum of the voltage drop across the damper tube 14 due to ringing current and the opposite-phase voltage across coil section 17. By proper choice of values of the elements 16 to 19, these two opposing voltages are caused to be substantially equal and the voltage across coil section 17 effectively counteracts the voltage drop across the damper tube. In choosing the values of elements 16 to 19, it should be noted that resistor 18 adjusts the magnitude balance of the voltages, while the inductor 16—17 or the capacitor 19 adjusts the phase balance of the voltages.

Referring now to Fig. 2, there is shown a preferred embodiment of the present invention, which embodiment is a joint invention specifically claimed in a copending application of A. Hopengarten et al., Serial No. 632,099, filed January 2, 1957. In Fig. 2, the horizontal deflection system is similar to that of Fig. 1 in that it includes the usual elements which are designated by the same references numerals as in Fig. 1. In this instance, however, the counteracting voltages is applied between the damper tube and the low potential end of the horizontal deflection coils. This voltage is produced by means of a small transformer 20 having a primary winding 21 connected to the low potential end of the winding of transformer 11, and having a secondary winding 22 serially connected between the damper tube 14 and the low potential end of the horizontal deflection coils 12.

With this arrangement, ringing current flowing in the primary of the transformer 20 produces a voltage across secondary 22 in proper polarity to oppose the ringing voltage drop across the damper tube. The voltage across secondary 22 effectively boosts the voltage at the normally low potential end of the deflecting coils 12. With proper choice of ratio of transformer 20, the boosting voltage effectively counteracts the ringing voltage drop across the damper tube and causes both ends of the deflecting coils to be of substantially the same potential with respect to ground at the ringing frequency. However, this condition cannot exist exactly during the entire scan interval because of the change in damper tube resistance between its low value when it conducts heavily at the start of the scan and its higher value when it conducts less heavily at the end of the scan.

To overcome this objection, the voltage across secondary 22 may be made to match the ringing voltage drop across the damper tube during part of the scan, and provision may be made for damping the ringing current during another part of the scan. Preferably, the voltage across the secondary 22 is made to match the ringing voltage drop across the damper tube at the start of the scan, and provision is made for damping the ringing current during the latter part of the scan. To this end, the transformer 20 is made self-resonant at the ringing frequency and its windings are shunted by resistances 23 and 24. Consequently, its losses are great enough to end the ringing while the damper tube is conducting relatively heavily.

From the foregoing description, it will be seen that this invention is novelly characterized in that it produces, in response to ringing current, a voltage which is effective to counteract the voltage drop across the damper tube due to ringing current, thus causing both ends of the deflection coils to be at substantially the same potential with respect to ground at the ringing frequency so that little or no ringing current flows in the deflection coils.

While certain embodiments of the invention have been illustrated and described, it is to be understood that the invention is not limited thereto but contemplates such modifications and further embodiments as may occur to those skilled in the art.

I claim:

1. In a horizontal deflection system for a cathode ray tube having a deflection yoke including horizontal deflection coils, means including an output transformer connected to said coils for supplying deflection current to the coils, a damper tube connected to said transformer, there being ringing current flow from said transformer through said damper tube during at least part of the scan interval, which produces a voltage drop across the damper tube and thus tends to produce ringing current in said coils, and transformer means arranged to receive ringing current and to produce in response to the ringing current, between said damper tube and said coils, a voltage effective substantially to nullify or counteract said voltage drop, thereby substantially to prevent the presence of ringing voltage across said coils and thus prevent flow of ringing current therein.

2. A horizontal deflection system according to claim 1, wherein said transformer means comprises a pair of closely-coupled coil sections serially connected between the output transformer and the high potential end of the deflection coils, the junction point of said coil sections being connected to the damper tube.

3. A horizontal deflection system according to claim 2, wherein said closely-coupled coil sections are resonant at the ringing frequency and are shunted by a resistance.

References Cited in the file of this patent

UNITED STATES PATENTS

| | | |
|---|---|---|
| 2,613,334 | Otis | Oct. 7, 1952 |
| 2,693,549 | Vonderschmitt | Nov. 2, 1954 |
| 2,743,381 | Dietch | Apr. 24, 1956 |
| 2,784,344 | Vonderschmitt | Mar. 5, 1957 |
| 2,792,523 | Bendell | May 14, 1957 |